March 10, 1953    M. W. McCOMBS    2,630,928
DUMPING APPARATUS FOR TRUCK BODIES AND TRAILERS
Filed Aug. 7, 1950    5 Sheets-Sheet 1
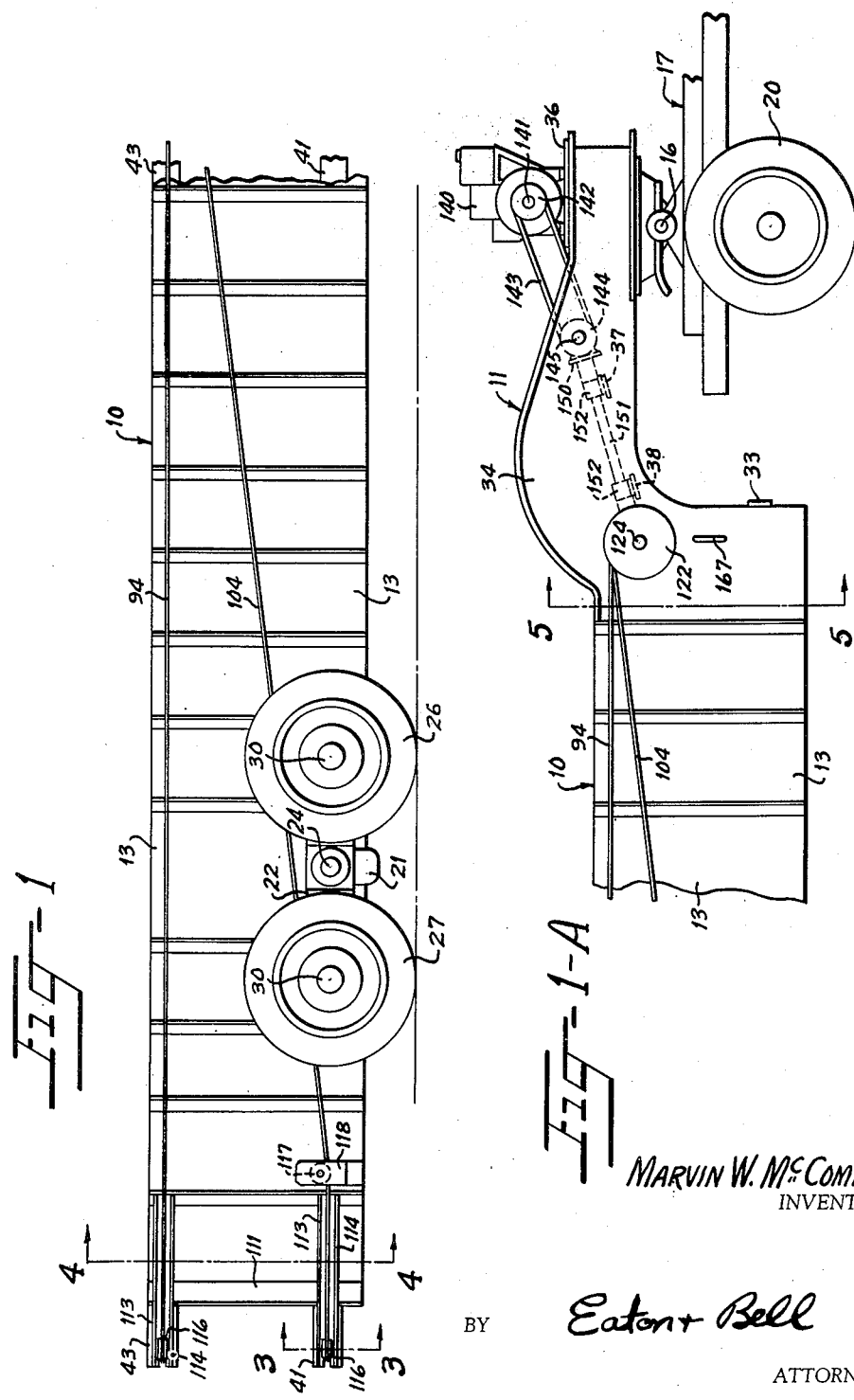
MARVIN W. McCOMBS,
INVENTOR.
BY  Eaton + Bell
ATTORNEYS.

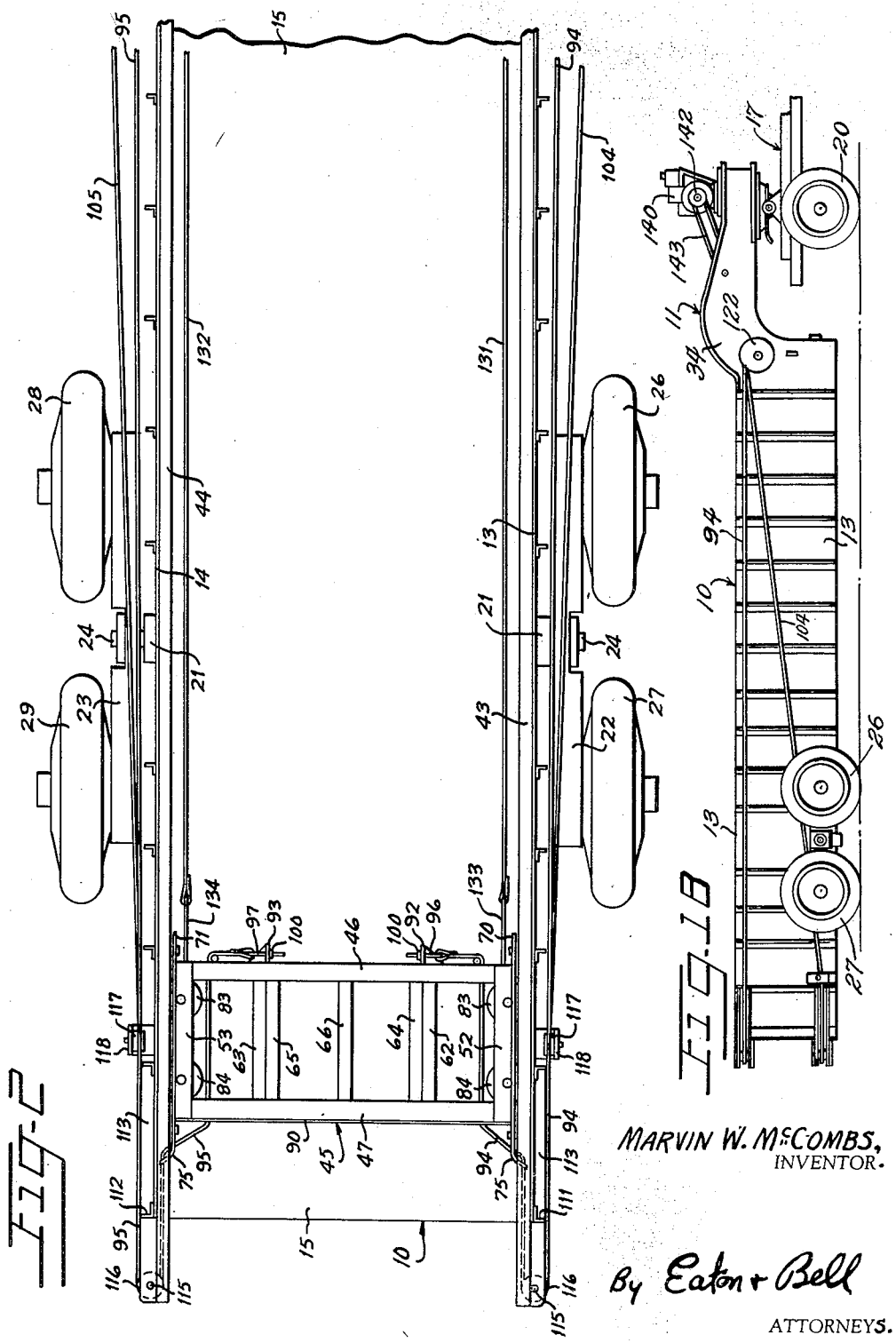

March 10, 1953 M. W. McCOMBS 2,630,928
DUMPING APPARATUS FOR TRUCK BODIES AND TRAILERS
Filed Aug. 7, 1950 5 Sheets-Sheet 3
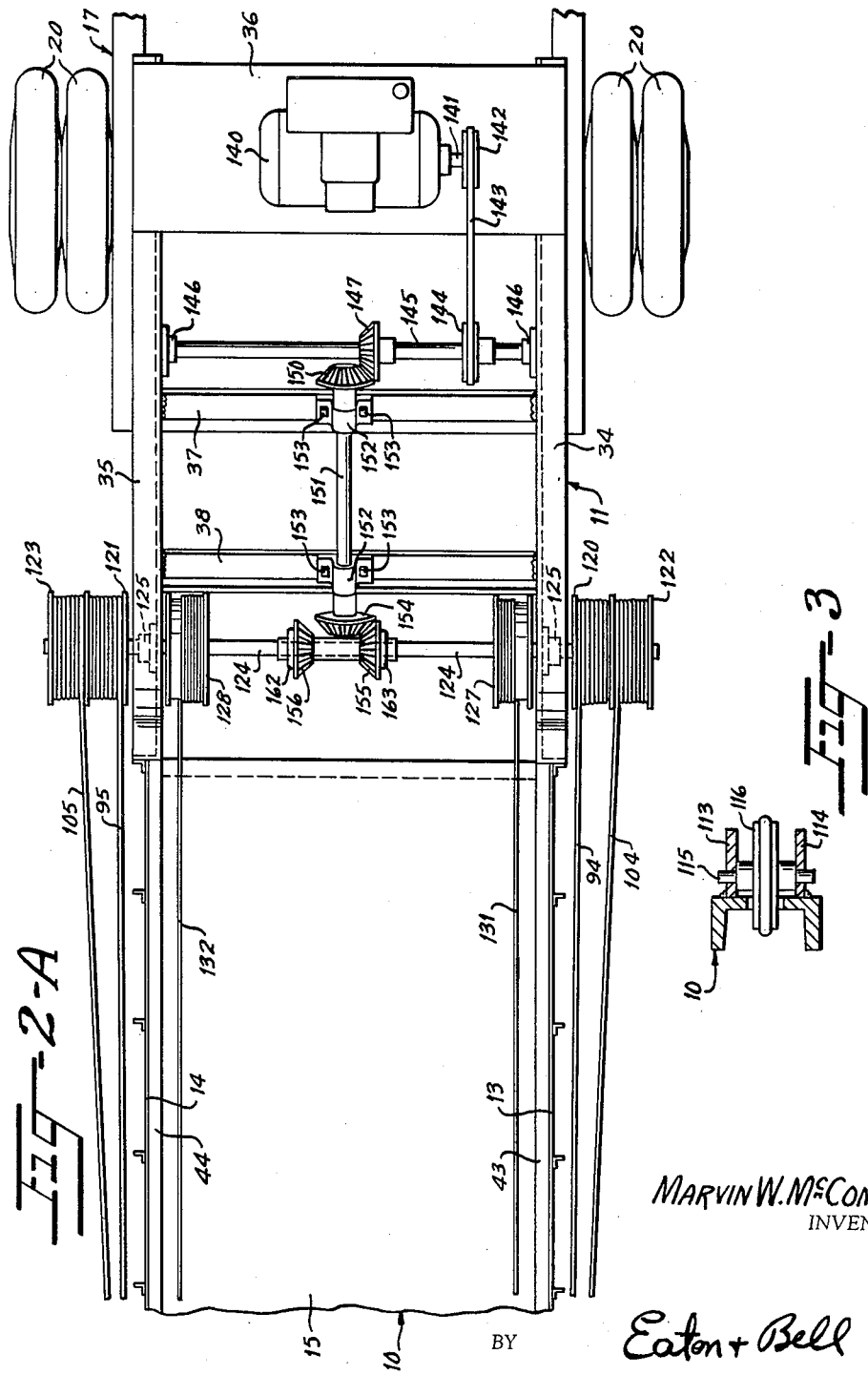
MARVIN W. McCOMBS,
INVENTOR.
BY Eaton + Bell
ATTORNEYS.

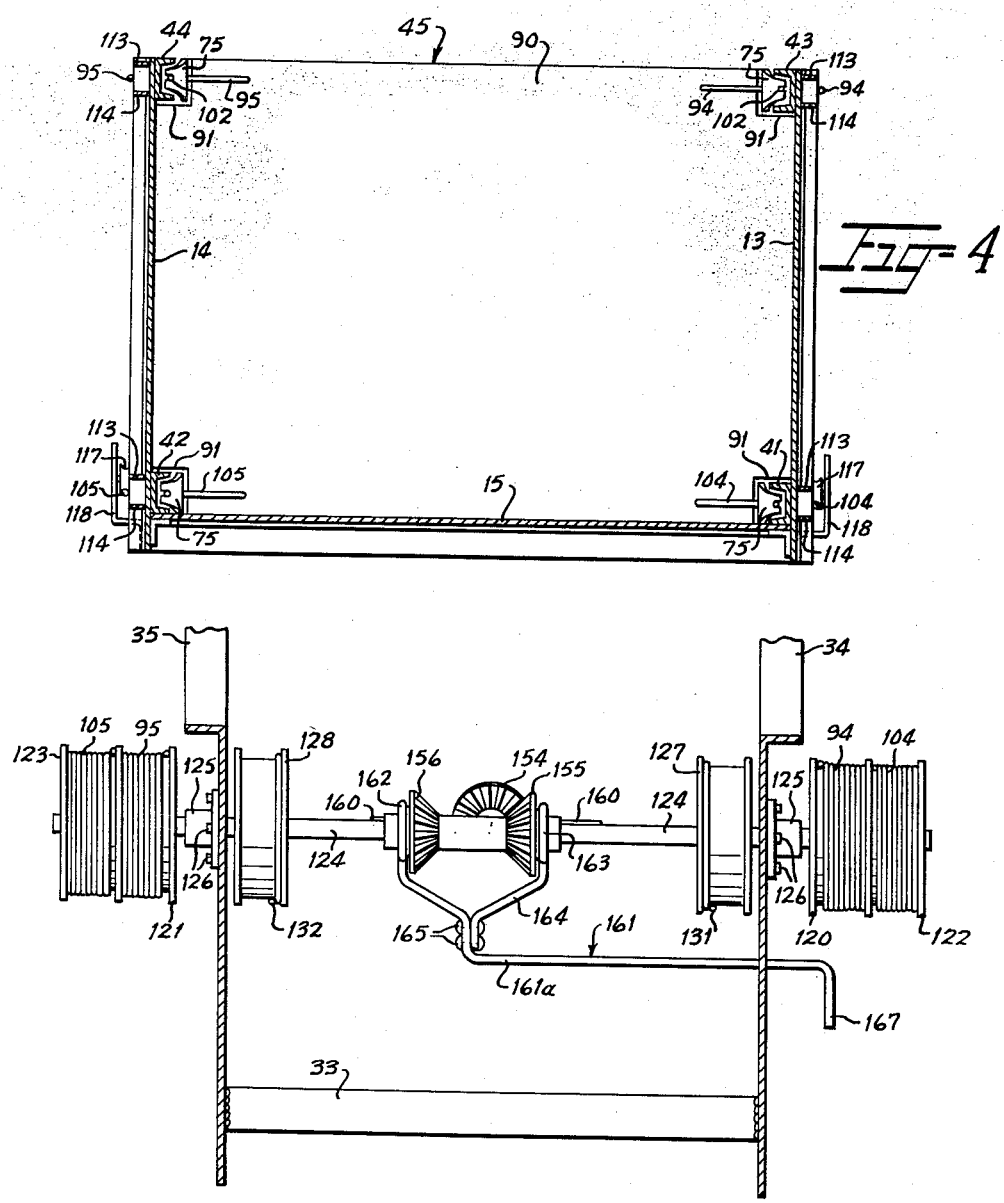

March 10, 1953 M. W. McCOMBS 2,630,928
DUMPING APPARATUS FOR TRUCK BODIES AND TRAILERS
Filed Aug. 7, 1950 5 Sheets-Sheet 5
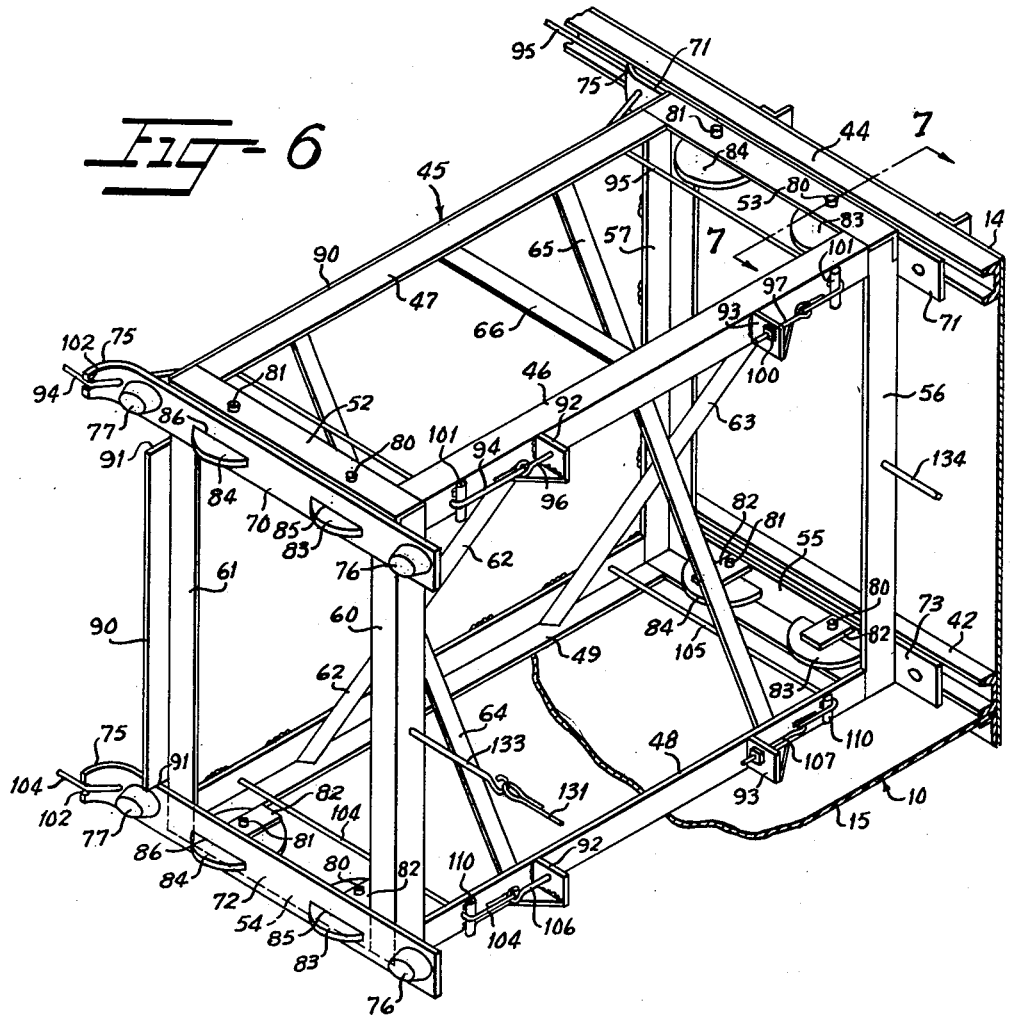
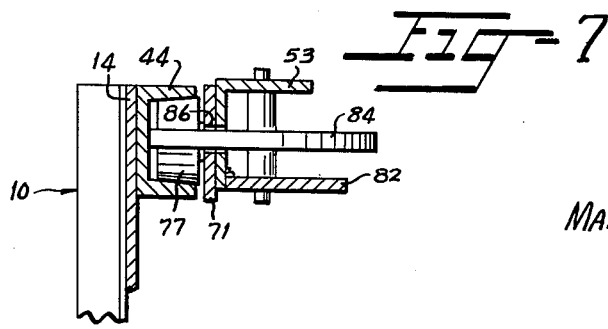
MARVIN W. McCOMBS,
INVENTOR.
BY Eaton + Bell
ATTORNEYS.

Patented Mar. 10, 1953

2,630,928

UNITED STATES PATENT OFFICE 2,630,928

DUMPING APPARATUS FOR TRUCK BODIES AND TRAILERS

Marvin W. McCombs, Statesville, N. C.

Application August 7, 1950, Serial No. 178,045

2 Claims. (Cl. 214—82)

This invention relates to an improved apparatus for garabage disposal and the like and more especially to an improved end gate for trucks and trailers which is adapted to be moved longitudinally from the forward to the rear end of a truck or trailer bed to force the contents thereof out through the rear end of the truck or trailer bed.

Since truck bodies and trailers which are used in transporting garbage and the like are substantially long, it is necessary that some means such as a movable gate mechanism which may be moved longitudinally of the body be employed for emptying the contents of the truck or trailer, and that this movable gate be so constructed as to be movable along the truck bed or trailer bed without subjecting the moving parts thereof to undue stress.

It is therefore the primary object of this invention to provide an improved end or movable gate mechanism comprising a reenforced substantially rectangular framework having upper and lower forwardly and rearwardly extending side frame members on opposed sides thereof each of which supports a plurality of rollers mounted on a vertical axis and also two or more rollers mounted on a horizontal axis, the truck or trailer body being provided with vertically spaced longitudinally extending channel bars, the flanges of which extend inwardly from the proximate surfaces of the side walls of the body or bed, the rollers having a vertical axis being adapted to ride against the vertical inner surfaces of the channel bar, trackways and the rollers having a horizontal axis being adapted to ride against the upper and lower proximate surfaces of the flanges of the channel bar trackways, the rollers thus serving to insure that the end gate mechanism may be easily moved longitudinally of the truck or trailer bed and further to insure that the gate will not be placed under undue tortional stress or strain and whereby the gate will retain its attitude transversely of the bed and will not tilt one way or another.

It is another object of this invention to provide, in an end or tail gate mechanism of the type described, means for moving the tail gate longitudinally of the truck or trailer bed comprising a transverse shaft rotatably mounted in the trailer or truck body forwardly of the bed and means for driving the transverse shaft, said transverse shaft having one or more pulleys or drums on opposed ends thereof and also having one or more pulleys fixed on the medial portions thereof and cables extending from the outer drums or pulleys to the rearmost portions of the framework of the end gate mechanism and the innermost of the drums or rollers having cables extending therefrom to the front end of the framework. The cables on the outer drums extend from the upper surfaces of the drums over pulleys at the rear of the truck or trailer bed and are connected to the rear of the framework and the cables on the inner drums extend from the lower portions thereof to the front end of the framework whereby, upon rotation being imparted to the shaft on which the drums are mounted in one direction, the cables on the inner drums will be taken up thereby to pull the framework of the end gate towards the same while the cables on the outer drums will be payed out therefrom correspondingly and, upon reverse rotation of the shaft, the cables connected to the outer drums on said shaft will cause the end gate to move toward the rear of the truck and the cables on the inner drums will be payed out thereby correspondingly.

Some of the objects of the invention having been stated, other objects will appear as the description proceeds when taken in connection with the accompanying drawings in which—

Figure 1 is a side elevation of the rear portion of a trailer showing the improved end gate in association therewith;

Figure 1-A is a side elevation being an extension of the right-hand portion of Figure 1 showing the front end of the trailer connected to the rear end of a tractor and illustrating driving means for controlling movement of the improved end gate mechanism;

Figure 1-B is a diagrammatic view showing the trailer of Figures 1 and 1-A in side elevation on a reduced scale.

Figure 2 is an enlarged top plan view looking at the top of Figure 1;

Figure 2-A is an extension of the right-hand end of Figure 2 and is a top plan view looking at the top of Figure 1-A;

Figure 3 is an enlarged fragmentary vertical-sectional view taken substantially along the line 3—3 in Figure 1;

Figure 4 is an enlarged vertical-sectional view taken substantially along the line 4—4 in Figure 1 and showing the rear end of the end gate mechanism in elevation;

Figure 5 is an enlarged vertical-sectional view taken substantially along the line 5—5 in Figure 1-A and showing a part of the control means for controlling movement of the end gate longitudinally of the trailer bed;

Figure 6 is an isometric view of the end gate assembly showing the framework thereof and showing a portion of one of the side walls and a portion of the bottom of the trailer bed in association therewith;

Figure 7 is an enlarged fragmentary vertical-sectional view taken substantially along the line 7—7 in Figure 6.

The present invention may be employed in association with a tiltable truck bed or a tractor-trailer or any other type of device having a bed which may be employed in transporting aggregate or granular materials from one place to another and wherein it is desired to remove the contents of the transporting device by dumping the same at the rear end of the transporting device.

For purposes of illustration, the invention is shown in association with a tractor-trailer and, referring more specifically to the drawings, the trailer is broadly designated at 10 and includes a front end frame or gooseneck 11 which extends rearwardly and is connected to side walls 13 and 14 and a bottom or floor 15 which spans the distance between the side walls 13 and 14.

It will be observed in Figure 1-A that the front end of the frame 11 is suitably connected, as at 16, to the fifth wheel at the rear end of a tractor broadly designated at 17, only the rear portion of which is shown in Figure 1-A and which is supported on ground wheels 20, only one of which is shown in Figure 1-A. The side walls 13 and 14 and the floor or bottom 15 constitute the trailer bed which is supported intermediate its ends on an axle 21, to the opposed ends of which carriages or dollies 22 and 23 are pivotally connected, as at 24.

The dollies or carriages 22 and 23 have ground wheels 26 and 27 and 28 and 29, respectively, rotatably mounted thereon as at 30.

If so desired, a front wall may be disposed at the front end of the bed of the trailer 10. However a front wall is not necessary with the improved type of end gate assembly, to be presently described, and a suitable cross brace member 33 may be employed in lieu of a front wall for the bed for reenforcing the front end of the trailer 10. The front end frame 11 includes side members 34 and 35 to the upper surfaces of which opposed ends of a motor support plate 36 are suitably secured, as by welding, and these side members 34 and 35 of the front fame 11 also support opposed ends of bearing support bars 37 and 38 as by welding. The purposes of the members 36, 37 and 38 will be presently described.

Suitably secured, as by welding, to the proximate inner surfaces of the side walls 13 and 14 and at their juncture with the bottom 15 of the bed are lower trackways 41 and 42, the trackways 41 and 42 being in the form of channel bars having their flanges facing inwardly. Also secured to the proximate surfaces of the side walls 13 and 14 are upper trackways 43 and 44, respectively, the trackways 43 and 44 also being in the form of channel bars and having their flanges facing inwardly.

Mounted for movement along the trackways 41 to 44, inclusive, is an improved end gate assembly broadly designated at 45. This end gate assembly 45 is of welded construction and includes front and rear upper and lower transverse horizontally disposed frame members 46 to 49, inclusive, which are shown in the form of angle bars. Opposed ends of the front and rear upper horizontally disposed frame members 46 and 47 are suitably secured, as by welding, to opposed ends of longitudinally extending frame members 52 and 53, opposed ends of the lower transverse frame members 48 and 49, being connected to similar longitudinally extending frame members 54 and 55. The front and rear ends of the left-hand upper and lower longitudinally extending frame members 53 and 55, respectively, are suitably connected, as by welding, to the opposed ends of vertically disposed left-hand end frame members 56 and 57 respectively. The front and rear ends of the right-hand longitudinally extending upper and lower frame members 52 and 54 respectively, are connected to the upper and lower ends of vertically disposed right-hand end frame members 60 and 61. All of the frame members 46 to 61 associated with the end gate assembly 45 are shown in the form of angle bars.

In order that the various transverse frame members may remain rigid with respect to each other, suitable diagonally extending brace members 62 and 63 are secured, as by welding, at their upper ends to the upper front transverse frame member 46 and are connected at their lower ends to the lower rear transverse frame member 49. A similar pair of diagonally extending bracing members 64 and 65 are spaced apart from each other and are suitably secured, as by welding, at their upper ends to the upper rear transverse frame member 47 and at their lower ends to the lower front transverse frame member 48. A suitable longitudinally extending frame member 66 is suitably secured, as by welding, at opposed ends thereof intermediate the ends of the front and rear upper frame members 46 and 47 of the framework 45.

Suitable gate carrier support members or carrier bars 70 to 73 are suitably secured, as by welding, to the outer surfaces of the respective longitudinally extending frame members 52 to 55, inclusive, these gate carrier bars 70 to 73, inclusive, preferably extending beyond the opposed ends of the corresponding longitudinally extending frame members 52 to 55, inclusive, and being reduced and turned inwardly at their rear ends, as at 75. The reduced front ends 75 of the carrier bars 70 to 73, inclusive, are adapted to move between the flanges of the respective trackways 43, 44, 41 and 42 as the framework and the end gate assembly 45 is moved longitudinally of the bed of the trailer in a manner to be presently described.

The front and rear end portions of each of the gate carrier support bars 70 to 73, inclusive, have outwardly projecting guide rollers 76 and 77, respectively, rotatably mounted thereon, the guide rollers 76 and 77 being disposed on a horizontal axis and preferably being tapered so as to be smaller at their outer ends than they are at their inner ends to correspond to the tapered proximate surfaces which are usually provided on rolled channel bars so these rollers 76 and 77 may ride on the upper surfaces of the lower flanges of the corresponding channel bars forming trackways 41 to 44.

It will also be observed in Figures 2 and 6 that each of the longitudinally extending frame members 52 and 55, has one end of a pair of longitudinally spaced axles 80 and 81 fixedly secured therein, as by a pressed fit, and the opposite ends of these axles 80 and 81, associated with each of the longitudinally extending frame members 52 to 55, inclusive, are each fixedly secured, as by a pressed fit, in a corresponding support plate 82, the outer ends of which are suitably secured, as by welding to the vertical flange of the corresponding longitudinally extending frame members 52 and 55, inclusive. Front and rear guide rollers 83 and 84, respectively, are rotatably mounted on the respective axles 80 and 81 and each of the vertical flanges of the longitudinally extending frame members 52 to 55, inclusive, and the coinciding gate carrier bars 70 to 73, inclusive are provided with coinciding openings 85 and 86 for the respective rollers 83 and 84 which loosely penetrate said openings 85 and 86 and are adapted to ride against the inner surfaces of the web of the channel bars 41 to 44, inclusive.

The transverse upper and lower frame members 47 and 49, respectively, and the vertically disposed end frame members 57 and 61 constitute a rectangular frame against the rear surfaces of which a gate plate 90 is suitably secured, as by welding, this plate 90 being notched, as at 91 at its four corners so the out-turned rear end portions 75 of the corresponding carrier bars 70 to 73, inclusive, may extend through said notches 91 in the plate 90 for purposes to be presently described. The notch 91 at each corner of the gate plate 90 is also provided so the plate 90 may span the distance between the proximate surfaces of the side walls 13 and 14, opposed side edges of the plate 90 terminating in closely spaced relation to the adjacent side walls 13 and 14 between the respective trackways 41 to 44, inclusive.

The front transversely extending upper and lower frame members 46 to 48 of the gate assembly 45 each has a pair of spaced anchor plates 92 and 93 welded thereto and extending forwardly therefrom. The plates 92 and 93 projecting from the upper transverse frame member 46 have respective cables 94 and 95 connected thereto by means of respective eye bolts 96 and 97. These eye bolts 96 and 97 slidably penetrate the respective anchor plates 92 and 93 on the angle bar 46 and each has a nut 100 threadably mounted thereon for adjustment of the length and tension of the cables 94 and 95.

Each of the cables 94 and 95 extends toward the corresponding walls 13 and 14 of the trailer 10 and then passes around a guide member in the form of a pin 101 suitably secured, as by welding, to the rear surface of the transverse frame member 46. The cables 94 and 95 then extend rearwardly and slidably penetrate the front and rear transverse frame members 46 and 47 of the gate 45 as well as the gate plate 90. The cables 94 and 95 then extend rearwardly in diverging relation to each other and slidably penetrate the portions of the carrier bars 70 and 71 which extend rearwardly beyond the gate plate 90 after which they again extend outwardly and rearwardly in diverging relation to each other, the outer edges of each of the portions 75 of the corresponding carrier bars 70 and 71 being notched, as at 102, for passage of the corresponding cables 94 and 95 therethrough and between the upper and lower flanges of the corresponding trackways 43 and 44.

The ends of lower cables 104 and 105 are connected to the respective anchor plates 92 and 93 associated with the lower transverse frame member 48 of the gate assembly 45 by means of bolts 106 and 107 respectively. The cables 104 and 105, like the cables 94 and 95, then extend outwardly toward the side walls 13 and 14 and pass in engagement with suitable guiding means such as cylindrical-shaped pins 110 and then extend rearwardly and successively slidably penetrate the transverse lower frame members 48 and 49 as well as the lower portion of the gate plate 90 of the gate assembly 45. The cables 104 and 105 then extend rearwardly and outwardly in diverging relation to each other and slidably penetrate the corresponding rearwardly extending portions of the carrier support members or carrier bars 54 and 55. The cables 104 and 105 then extend outwardly in diverging relation to each other and then extend forwardly through the corresponding notches 102 in the outwardly bent portions 75 of the corresponding carrier bars 54 and 55 to extend rearwardly between the upper and lower flanges of the corresponding trackways 41 and 42.

Referring to Figures 1 and 2, the rear edges of the side walls 13 and 14 are reenforced and defined by vertically disposed angle bars 111 and 112 respectively. The bottom 15 of the bed also terminates in the vertical plane of these angle bars 111 and 112. It will also be observed in Figures 1 and 2 that the trackways 41 and 44, inclusive, extend rearwardly a substantial distance beyond the side walls 13 and 14 and welded to the outer surface of each of the trackways 41 to 44, inclusive, is a pair of vertically spaced pulley support bars 113 and 114 (Figure 3) in which opposed ends of a vertically disposed axle or shaft 115 are suitably secured, as by a pressed fit. A grooved pulley 116 is rotatably mounted on the axle 115 and the corresponding cables 94, 95, 104 and 105 pass around the respective or corresponding pulleys 116 after extending rearwardly between the flanges of the respective trackways 43, 44, 41 and 42.

Each of the lower cables 104 and 105 extends forwardly from the corresponding pulleys 116 at the rear end of the respective trackways 41 and 42 and then passes beneath and in engagement with a pulley 117 rotatably mounted in a suitable strap iron bracket 118 provided therefor, this strap iron bracket extending inwardly at its lower end, in Figure 4, and being suitably secured, as by welding, to the outer surface of the corresponding wall 13 or 14. The cables 94, 95, 104 and 105 then extend forwardly and we are wound a few turns around corresponding drums or rollers 120 to 123, inclusive, respectively, to which their free ends are suitably secured. The drums 120 to 123 are fixedly mounted on opposed end portions of a transverse shaft 124 rotatably mounted in a bearing block 125 suitably secured, as by screws 126 (Figure 5) to the members 34 and 35 of the front frame 11.

If so desired, the drums 120 and 122 may be integral with each other and separated by a suitable flange or they may be separate drums as heretofore described. The same is true of the drums 121 and 123. The drums 120 to 123, inclusive, may be disposed interiorly or exteriorly of the frame members 34 and 35 and are illustrated as being disposed exteriorly of the frame members 34 and 35 of the front frame 11 and may be referred to as outer drums since there is also provided a pair of spaced inner drums 127 and 128 fixedly mounted on the shaft 124 and which are disposed adjacent the proximate surfaces of the side frame members 34 and 35 of the front frame 11 or interiorly of the drums 120 to 123.

The front ends of a pair of cables 131 and 132 are suitably secured to the peripheries of the respective drums 127 and 128 and are wound a few turns about said drums after which they extend rearwardly and are suitably secured to the framework of the gate assembly 45 as through the medium of respective eye bolts 133 and 134 which slidably penetrate the respective vertically disposed frame members 69 and 56 of the gate assembly 45 intermediate the ends thereof, each of these eye bolts 133 and 134 having a suitable nut, not shown, threadably mounted on the rear end thereof as to provide longitudinal adjustment of the the cables 131 and 132 relative to the gate assembly 45.

The shaft 124 is adapted to be driven in opposite directions by any suitable means and said means are illustrated as a suitable motor or engine 140 which, in this instance, is shown as an internal combustion engine. It might be stated that the apparatus for imparting rotation to the shaft 124 may be driven from a suitable power take-off of the tractor, or in the event of a truck being employed in lieu of the trailer, the movable gate may be actuated by power furnished from the motor of the truck.

The engine 140 has a shaft 141 extending therefrom in which a grooved pulley 142 is fixedly mounted. A suitable endless belt 143 is mounted on the grooved pulley 142 as well as a second grooved pulley 144 fixedly mounted on jack shaft 145. The jack shaft 145 is rotatably mounted in suitable bearings 146 suitably secured to the proximate surface of the frame members 34 and 35 of the front frame 11.

The shaft 145 has a beveled gear 147 fixedly mounted thereon which meshes with a mating beveled gear 150 fixedly mounted on the rear end of a forwardly and downwardly extending drive shaft 151. The drive shaft 151 is rotatably mounted in bearing blocks 152 suitably secured, as by screws 153, to the upper surfaces of the transverse from members 37 and 38 heretofore described. The lower rear end of the shaft 151 has a beveled gear 154 fixedly mounted thereon which is adapted to be alternately engaged by beveled gears 155 and 156.

The beveled gears 155 and 156 are keyed as by a key 160, to the transverse shaft 124 on which the drums 120 and 123 are fixedly mounted, the beveled gears 155 and 156 being movable lengthwise of the shaft by means of a shifting member 161 which may be of any desired structure and is shown in Figures 3 and 5 in the form of a bar having an upwardly and outwardly bent portion provided with an annulus 162 at the upper end thereof which is adapted to encircle the hub of the beveled gear 156.

The hub of the beveled gear 155 is also encircled by an annulus 163 which has a downwardly extending portion 164 integral therewith which extends inwardly and downwardly at an angle and is connected, as by rivets 165, to the bar 161a. The bar 161a of the shifter 161 extends outwardly and is mounted for lateral sliding movement in the side frame member 34 and is provided with a suitable handle 167 which is adapted to be grasped by an operator for moving the desired beveled gear 155 or 156 into engagement with the beveled gear 154. It is evident that the beveled gears 155 and 156 may both be positioned out of engagement with the beveled gear 154 during periods when it is not desired to move the end gate assembly 45.

In operation, it is to be assumed that the shaft 141 of the motor 140 rotates in a clockwise direction in Figure 1-A. This will cause the beveled gear 154 (Figure 5) to rotate in a counter-clockwise direction and, assuming the beveled gear 155 to be in engagement with the beveled gear 154 as shown in Figure 5, the transverse shaft 124 will rotate in a counter-clockwise direction in Figure 1-A.

This will cause the drums 127 and 128 on the shaft 124 to take up on the respective cables 131 and 132 as the cables 94, 95, 104 and 105 are payed out by the respective drums 120 to 123, inclusive, which will result in the cables 131 and 132 pulling the end gate assembly 45 forwardly. It is evident that upon shifting the position of the beveled gears 155 and 156 so the beveled gear 156 engages the beveled gear 154, rotation will be imparted to the transverse shaft 124 in a clockwise direction in Figure 1-A with the result that the cables 94 to 105 on the respective drums 120 to 123 will be taken up on the drums as the cables 131 and 132 are payed out by the respective drums 127 and 128 on the shaft 124. Thus, the end gate assembly 45 will move rearwardly along the trackways 41 to 44, inclusive, and in so doing, the gate plate 90 will slide the contents of the bed of the trailer 10 along the floor 15 thereof to be discharged at the rear end of the trailer. The trackways 41 to 44, inclusive, extend beyond the rear edges of the side walls 13 and 14 and the bottom 15 to thus insure that the entire contents of the trailer will be dumped off of the rear edge of the floor 15 of the bed of the trailer 10.

In the drawings and specification, there has been set forth a preferred embodiment of the invention and although specific terms are employed, they are used in a generic and descriptive sense only and not for purposes of limitation, the scope of the invention being defined in the claims.

I claim:

1. An improvement in trucks, trailers and the like having a bed provided with a bottom and spaced side walls, said improvement comprising an end gate mechanism including a substantially rectangular frame, channel bars having a web portion and flange portions forming trackways extending longitudinally of the side walls and secured to the proximate surfaces thereof, said substantially rectangular frame extending transversely of the bed and terminating at opposed sides thereof adjacent the trackways, a gate plate secured to the rear surface of said substantially rectangular frame and having notches at each corner thereof through which the trackways may extend, said frame having a plurality of rollers mounted on vertical axes therein and being adapted to ride against the proximate surfaces of the webs of the channel bars, said frame also having a plurality of second rollers mounted on horizontal axes therein and adapted to ride in engagement with the flanges of the channel bars means for selectively imparting movement to the frame longitudinally of the bed in two directions, said means for imparting movement to the frame comprising said trackways extending substantially beyond the rear edges of said side walls and having rollers rotatably mounted therein, a transverse shaft disposed adjacent the front ends of said side walls and having at least one drum on opposed ends thereof and having a second drum spaced adjacent each of said first drums, cables extending from the first-named drums partially around the rollers in the rear ends of said trackways and then extending forwardly and being connected to the frame, second cables extending from the second drums and being connected at their rear ends to the front end of said frame and means for selectively imparting rotation to the transverse shaft in either direction, the cables being so connected to the corresponding drums that upon rotation being imparted to the transverse shaft in one direction, the cables extending from the front of said frame will be taken up by one pair of drums as the cables extending from the other drums are payed out and vice versa for moving said frame longitudinally of the bed.

2. In a truck or trailer having a bed formed of a bottom wall and two side walls, and adapted to contain aggregate and the like, means for removing the aggregate from the bed comprising the side walls of said bed having trackways on the proximate surfaces thereof, a frame extending transversely of said bed and supported by a plurality of rollers mounted therein and adapted to ride in said trackways, said frame having a gate plate secured to the rear portion thereof, said gate plate extending between the said side walls and in closely spaced relation thereto and in closely spaced relation to the bottom of said bed, means for moving said frame and gate plate longitudinally to the front end of said bed to permit said bed to be filled with aggregate and the like, means for moving said frame and gate plate to the rear of said bed to discharge the aggregate therefrom, said means for imparting movement to the frame and gate plate comprising said trackways extending substantially beyond the rear edges of said side walls and having pulleys rotatably mounted in the rearmost portions thereof, a transverse shaft disposed adjacent the front end of said bed and having a first set of drums thereon and a second set of drums thereon adjacent the first drums, cables extending from the first drums around the pulleys in the rear ends of said trackways and connected to the rear end of said frame, second cables extending from the second drums and connected to the front end of said frame, means for selectively imparting rotation to the transverse shaft in either direction, said cables being so connected to the corresponding drums that upon rotation being imparted to the transverse shaft in one direction, one set of cables will be taken up and the other set of cables will be payed out to move the frame from the front to the rear of said bed and upon rotation being imparted to the transverse shaft in the other direction, the movement of the cables will be reversed to move said frame from the rear to the front of said bed.

MARVIN W. McCOMBS.

REFERENCES CITED

The following references are of record in the file of this patent:

UNITED STATES PATENTS

| Number | Name | Date |
| --- | --- | --- |
| 837,170 | Wishon | Nov. 27, 1906 |
| 1,567,690 | Weaver | Dec. 29, 1925 |
| 1,856,441 | Standfuss | May 3, 1932 |
| 2,166,846 | McCalley | July 18, 1939 |
| 2,512,339 | Knapp, Jr. | June 20, 1950 |
| 2,541,538 | Newell | Feb. 13, 1951 |